US010623295B2

(12) United States Patent
Sanders et al.

(10) Patent No.: US 10,623,295 B2
(45) Date of Patent: Apr. 14, 2020

(54) INFRASTRUCTURE TESTING

(71) Applicant: CloudBolt Software Inc., Rockville, MD (US)

(72) Inventors: Bernard Sanders, Rockville, MD (US); Lisa Percival, Portland, OR (US)

(73) Assignee: CloudBolt Software Inc., Rockville, MD (US)

(*) Notice: Subject to any disclaimer, the term of this patent is extended or adjusted under 35 U.S.C. 154(b) by 30 days.

(21) Appl. No.: 15/248,380

(22) Filed: Aug. 26, 2016

(65) Prior Publication Data
US 2017/0346706 A1 Nov. 30, 2017

Related U.S. Application Data

(60) Provisional application No. 62/341,746, filed on May 26, 2016.

(51) Int. Cl.
*H04L 12/26* (2006.01)

(52) U.S. Cl.
CPC .................... *H04L 43/50* (2013.01)

(58) Field of Classification Search
CPC ........ H04L 43/045; H04L 41/04; H04L 43/50
USPC ........................................................ 709/224
See application file for complete search history.

(56) References Cited

U.S. PATENT DOCUMENTS

| 8,209,666 B1 * | 6/2012 | Schaub ............... G06F 11/3672 717/125 |
| 8,495,356 B2 | 7/2013 | Ashok et al. |
| 2007/0234293 A1 * | 10/2007 | Noller ................. G06F 11/3688 717/124 |
| 2010/0235526 A1 | 9/2010 | Carter et al. |
| 2010/0235903 A1 | 9/2010 | Carter et al. |

(Continued)

FOREIGN PATENT DOCUMENTS

CN          102185927 A        9/2011

OTHER PUBLICATIONS

Badger, et al., "Cloud Computing Synopsis and Recommendations", NIST—National Institute of Standards and Technology, May 2012, p. 81.

(Continued)

*Primary Examiner* — Meng Vang
(74) *Attorney, Agent, or Firm* — Morris & Kamlay LLP

(57) ABSTRACT

Provided are examples of apparatus and methods which relate to infrastructure testing, such as end-to-end reliability testing of a network deployed across one or more clouds in a cloud computing system. In an example method, a machine-executable order describing a computing network is received at a platform management device. The computing network can include a plurality of provisioned computing resources. The platform management device can be configured to manage a plurality of disparate platforms of pooled computing resources, such as disparate clouds in the cloud computing system. The computing network is deployed by executing the machine-executable order. At least one function of each provisioned computing resource in the plurality of provisioned computing resources can be tested. The testing can include transmitting one or more calls to a respective application program interface of each provisioned computing resource in the plurality of provisioned computing resources. The computing network can be decommissioned thereafter.

32 Claims, 4 Drawing Sheets

(56) References Cited

U.S. PATENT DOCUMENTS

| | | | |
|---|---|---|---|
| 2011/0010339 A1 | 1/2011 | Wipfel et al. | |
| 2011/0209064 A1* | 8/2011 | Jorgensen | G06F 9/54 715/733 |
| 2012/0173731 A1 | 7/2012 | Lin et al. | |
| 2012/0239825 A1 | 9/2012 | Xia et al. | |
| 2012/0260228 A1 | 10/2012 | Mallick et al. | |
| 2012/0278861 A1 | 11/2012 | Lu et al. | |
| 2013/0132473 A1* | 5/2013 | Hawkins | G06F 21/6218 709/204 |
| 2014/0115161 A1 | 4/2014 | Agarwal et al. | |
| 2014/0298112 A1* | 10/2014 | Otsuka | G06F 11/3452 714/47.3 |
| 2014/0325275 A1* | 10/2014 | Oh | G06Q 10/20 714/25 |
| 2015/0199197 A1* | 7/2015 | Maes | G06F 8/71 717/122 |
| 2015/0278066 A1* | 10/2015 | France | G06F 11/3452 709/224 |
| 2016/0373816 A1* | 12/2016 | Kashikar | H04N 21/4113 |

OTHER PUBLICATIONS

CloudBolt Software, "Actions", http://docs.cloudbolt.io/advanced/orchestration-actions/actions.html#action-input-parameters, 2015, p. 1.

CloudBolt Software, "Continuous Infrastructure Testing", http://docs.cloudbolt.io/advanced/continuous-infrastructure-testing/index.html, 2015, p. 1.

CloudBolt Software, "Orchestration", http://docs.cloudbolt.io/advanced/orchestration-actions/index.html, 2015, p. 1.

CoudBolt Software, "Order Form Customization", http://docs.cloudbolt.io/order-form-customization.html, 2015, p. 1.

CloudBolt Software, "Service Catalog Overview/Capabilities", http://docs.cloudbolt.io/service-catalog/index.html, 2015, p. 1.

* cited by examiner

INFRASTRUCTURE TESTING

CLAIM OF PRIORITY

The present Application for Patent claims priority to U.S. Provisional Patent Application No. 62/341,746 entitled "INFRASTRUCTURE TESTING", filed May 26, 2016, and assigned to the assignee hereof and hereby expressly incorporated by reference herein.

FIELD OF DISCLOSURE

This disclosure relates generally to electronics, and more specifically, but not exclusively, to methods and apparatus which relate to infrastructure testing.

BACKGROUND

Failures of an information technology (IT) infrastructure often go undetected until discovered by a customer at an inopportune time. The IT infrastructure often includes multiple computing resources provided by one or more cloud computing platforms. The cloud computing platforms are offered by different service providers; thus, different clouds have different platform-specific management platforms. The management platforms are at least partially incompatible across different service providers. Further, each management platform tends to be complex by itself, which makes managing deployments with multiple different management platforms even more complex. For example, routine changes made to a storage device, a network, a server configuration, a password, a domain name server, a virtual machine template, or an application can unexpectedly cause an incompatibility across different cloud computing platforms, which leads to at least a portion of the IT infrastructure to fail without notice.

SUMMARY

This summary provides a basic understanding of some aspects of the present teachings. This summary is not exhaustive in detail, and is neither intended to identify all critical features, nor intended to limit the scope of the claims.

Example methods and apparatus relating to infrastructure testing are disclosed. An example method includes receiving, at a platform management device, a machine-executable order describing a computing network. The computing network includes a plurality of provisioned computing resources. In an example, the platform management device can be configured to manage a plurality of disparate platforms of pooled computing resources. In an example, the plurality of provisioned computing resources can include: one or more objects, one or more clusters, one or more load balancers, one or more servers, one or more CPUs, a quantity of memory, one or more virtualization host systems, one or more domain name servers, one or more asset tracking systems, one or more monitoring systems, one or more backup systems, one or more hostname reservation systems, one or more change management systems, one or more Internet servers, one or more databases, one or more operating systems, one or more applications, one or more web sites, one or more pods of containers, one or more storage devices, a quantity of memory, one or more network devices, one or more security devices, one or more networks, one or more virtual networks, one or more virtualization host systems, one or more domain name storage systems, one or more asset tracking systems, one or more network monitoring systems, one or more hostname reservation systems, one or more change management systems, or a combination thereof. The method also includes deploying the computing network by executing, using the platform management device, the machine-executable order. In an example, the deploying includes deploying the computing network on: a first platform of first pooled computing resources, a second platform of second pooled computing resources, or a combination thereof. The method also includes testing at least one function of each provisioned computing resource in the plurality of provisioned computing resources. The testing includes transmitting, from the platform management device, one or more calls to a respective application program interface of each provisioned computing resource in the plurality of provisioned computing resources. In an example, the testing is performed on a substantially periodic basis. The example method can also include receiving data indicating test results of the testing. The method can also include displaying, using a video display, the data indicating the test results, and outputting, if at least a portion of the test results indicate one or more failures, a message, wherein the message is: an e-mail message, a text message, a communication sent via the Internet, or a combination thereof. The method can also include decommissioning the computing network after the testing.

In a further example, provided is a non-transitory computer-readable medium, comprising processor-executable instructions stored thereon. The processor-executable instructions can be configured to cause a processor to execute one or more parts of the aforementioned method. The processor-executable instructions can be configured to cause a processor to initiate executing one or more parts of the aforementioned method.

In another example, provided is a first apparatus. The first apparatus includes means for receiving a machine-executable order describing a computing network. The computing network includes a plurality of provisioned computing resources. In an example, the means for receiving can be configured to manage a plurality of disparate platforms of pooled computing resources. In an example, the plurality of provisioned computing resources can include: one or more objects, one or more clusters, one or more load balancers, one or more servers, one or more CPUs, a quantity of memory, one or more virtualization host systems, one or more domain name servers, one or more asset tracking systems, one or more monitoring systems, one or more backup systems, one or more hostname reservation systems, one or more change management systems, one or more Internet servers, one or more databases, one or more operating systems, one or more applications, one or more web sites, one or more pods of containers, one or more storage devices, a quantity of memory, one or more network devices, one or more security devices, one or more networks, one or more virtual networks, one or more virtualization host systems, one or more domain name storage systems, one or more asset tracking systems, one or more network monitoring systems, one or more hostname reservation systems, one or more change management systems, or a combination thereof. The first apparatus includes means for deploying the computing network by executing the machine-executable order. In an example, the means for deploying can include means for deploying the computing network on: a first platform of first pooled computing resources, a second platform of second pooled computing resources, or a combination thereof. The first apparatus includes means for testing at least one function of each provisioned computing resource in the plurality of provisioned computing resources. The means for testing includes means for transmitting one or more calls to a respective application program interface of each provisioned computing resource in the plurality of provisioned computing resources. In an example, the means for testing can be configured to perform the testing on a substantially periodic basis. In an example, the first apparatus can include means for receiving data indicating test results of the testing. In an example, the first apparatus can include means for displaying the data indicating the test results, and means for outputting, if at least a portion of the test results indicate one or more failures, a message. The message is: an e-mail message, a text message, a communication sent via the Internet, or a combination thereof. In an example, the first apparatus can include means for decommissioning the computing network after the testing.

In another example, provided is a second apparatus. The second apparatus includes a processor and a memory coupled to the processor. The memory is configured to cause the processor to initiate creating specific logic circuits within the processor. The specific logic circuits are configured to cause the processor to initiate receiving, at a platform management device, a machine-executable order describing a computing network, wherein the computing network includes a plurality of provisioned computing resources. In an example, the platform management device can be configured to manage a plurality of disparate platforms of pooled computing resources. In an example, the plurality of provisioned computing resources can include: one or more objects, one or more clusters, one or more load balancers, one or more servers, one or more CPUs, a quantity of memory, one or more virtualization host systems, one or more domain name servers, one or more asset tracking systems, one or more monitoring systems, one or more backup systems, one or more hostname reservation systems, one or more change management systems, one or more Internet servers, one or more databases, one or more operating systems, one or more applications, one or more web sites, one or more pods of containers, one or more storage devices, a quantity of memory, one or more network devices, one or more security devices, one or more networks, one or more virtual networks, one or more virtualization host systems, one or more domain name storage systems, one or more asset tracking systems, one or more network monitoring systems, one or more hostname reservation systems, one or more change management systems, or a combination thereof. The specific logic circuits are configured to cause the processor to initiate deploying the computing network by executing, using the platform management device, the machine-executable order. In an example, the deploying includes deploying the computing network on: a first platform of first pooled computing resources, a second platform of second pooled computing resources, or a combination thereof. The specific logic circuits are configured to cause the processor to initiate testing at least one function of each provisioned computing resource in the plurality of provisioned computing resources. The testing includes transmitting, from the platform management device, one or more calls to a respective application program interface of each provisioned computing resource in the plurality of provisioned computing resources. In an example, the memory can be configured to cause the processor to initiate creating specific logic circuits configured to cause the processor to perform the testing on a substantially periodic basis. In an example, the memory can be configured to cause the processor to initiate creating specific logic circuits configured to cause the processor to receive data indicating test results of the testing. In an example, the memory can be configured to cause the processor to initiate creating specific logic circuits configured to cause the processor to: display, using a video display, the data indicating the test results, and output, if at least a portion of the test results indicate one or more failures, a message, wherein the message is: an e-mail message, a text message, a communication sent via the Internet, or a combination thereof. In an example, the memory can be configured to cause the processor to initiate creating specific logic circuits configured to cause the processor to decommission the computing network after the testing.

The foregoing broadly outlines some of the features and technical advantages of the present teachings so the detailed description and drawings can be better understood. Additional features and advantages are also described in the detailed description. The conception and disclosed examples can be used as a basis for modifying or designing other devices for carrying out the same purposes of the present teachings. Such equivalent constructions do not depart from the technology of the teachings as set forth in the claims. The inventive features characteristic of the teachings, together with further objects and advantages, are better understood from the detailed description and the accompanying drawings. Each of the drawings is provided for the purpose of illustration and description only, and does not limit the present teachings.

BRIEF DESCRIPTION OF THE DRAWINGS

The accompanying drawings are presented to describe examples of the present teachings, and are not limiting.

Figure 1:
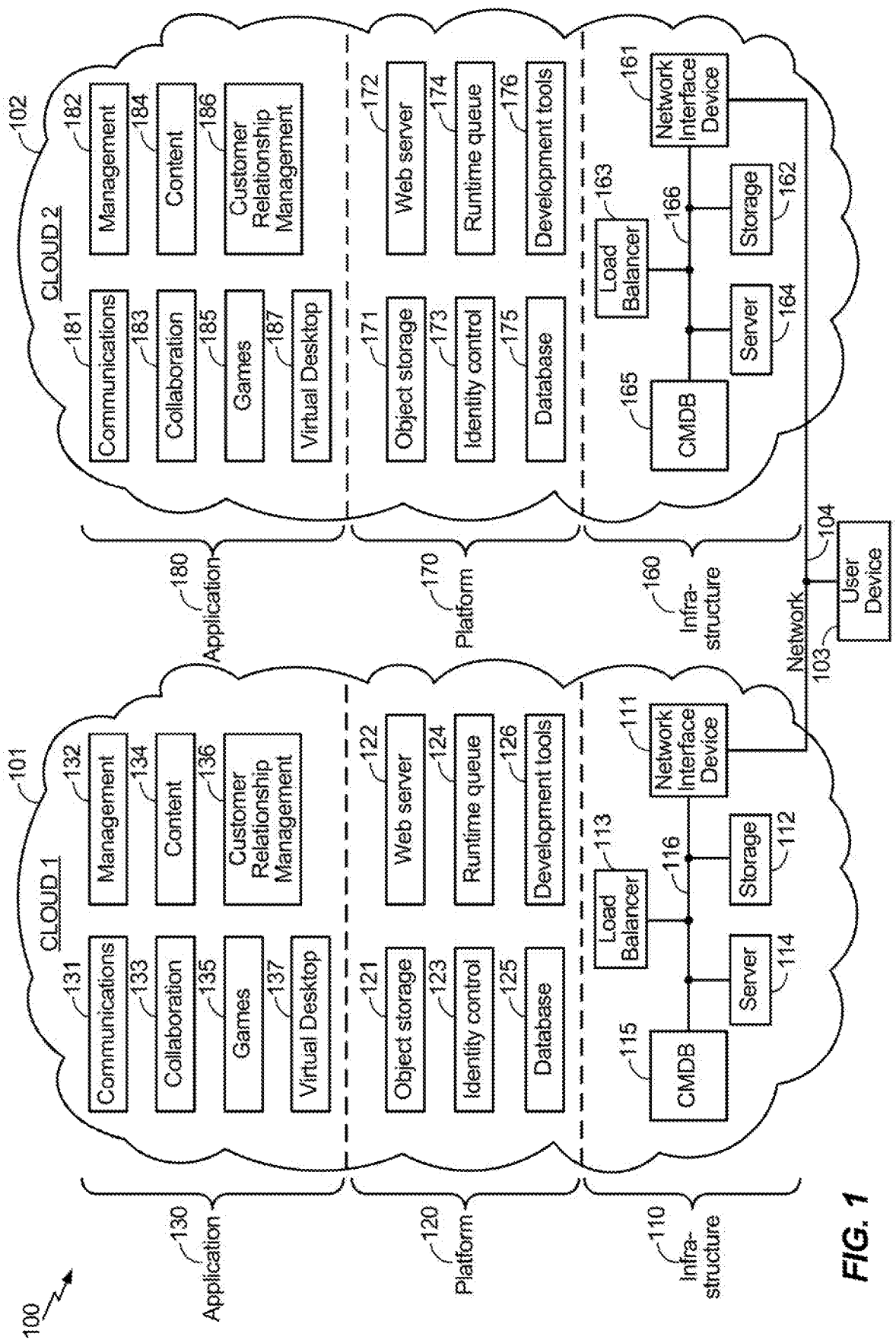
FIG. 1 depicts an example cloud computing arrangement.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

Provided are examples of apparatus and methods which relate to infrastructure testing, such as end-to-end reliability testing of a computing network which is deployed across one or more clouds (e.g., clouds having incompatible management platforms) in a cloud computing system. The computing network includes a plurality of provisioned computing resources. Computing resources can include computer hardware, computer software, the like, or a combination thereof. The plurality of computing resources can include computing resources located at multiple, disparate cloud computing systems. The platform management device can be configured to manage a plurality of disparate platforms of pooled computing resources, such as disparate clouds in the cloud computing system. In an example, at least one function of each provisioned computing resource in the plurality of provisioned computing resources is tested.

Examples disclosed hereby beneficially improve functioning of a computer (e.g., a platform management device) and improve an existing technological process (e.g., managing one or more cloud computing platforms). The provided examples can provide beneficial advantages in a timely manner and without inadvertently using a customer as a tester. Disclosed examples can advantageously test cloud ecosystem availability by performing end-to-end testing of at least one deployed computing resource to determine if the infrastructure target is performing as required. Disclosed examples can advantageously determine if a specific network configuration, such as a network configuration across multiple, disparate clouds, can perform as expected.

Disclosed examples can also advantageously eliminate a requirement that a user must manually program tests for each different respective disparate management platform for each target cloud on which computing resources are deployed. This saves time and resources, and can ease effort to implement the network. Disclosed examples can also save time, expenses, and resources; as well as ensure network availability; by automatically deploying a network, testing the end-to-end performance of the network across multiple cloud platforms, and then decommissioning the network. The provided examples also lower operational risk by making sure a specific network deployment across one or more clouds (such as including disparate clouds) will work as a whole. Thus, customer complaints due to IT infrastructure errors can be reduced, and in some examples, eliminated.

Examples are disclosed in this application's text and drawings. Alternate examples can be devised without departing from the scope of the disclosure. Additionally, conventional elements of the current teachings may not be described in detail, or may be omitted, to avoid obscuring aspects of the current teachings.

The following list of abbreviations, acronyms, and terms is provided to assist in comprehending the current disclosure, and are not provided as limitations.

API—application programming interface
CMDB—configuration management database
CPU—central processing unit
GUI—graphical user interface
IaaS—infrastructure as a service
IT—information technology
PaaS—platform as a service
SaaS—software as a service Cloud computing is a model for enabling one or more cloud users (a "user") to access a shared pool of computing resources. The computing resources can include computer hardware, computer software, the like, or a combination thereof. The computing resources can include one or more processors, one or more servers (physical, virtual, or both), one or more storage devices (for example, memory, disk storage, the like, and combinations thereof), one or more network devices, one or more networks (for example, a virtual network, including internet protocol addresses), one or more firewalls, one or more load balancers, one or more virtual machines, one or more operating systems, one or more software applications, one or more programming languages, one or more computer-based services, one or more pods of containers, one or more web servers, the like, or a combination thereof. The computing resources can be offered with a service model which suits a user's constraints (for example, skill level, needs, ability to pay, etc.). Cloud computing often has five characteristics: on-demand self-service by one or more users, broad network access, pooled computing resources, rapid elasticity, and measured service.

Users may not own the hardware constituting a cloud or the software run on the cloud's hardware. Instead, a user can lease, from a cloud provider, at least some portion of the hardware, at least some portion of the software, or both.

Cloud computing advantageously provides an economy of scale unattainable with user-owned and maintained resources. A user need not purchase a complete set of hardware and software necessary to complete a particular task or provide a particular service. Instead, the user only pays for the user's use (that is, a utility computing basis) or the user pays a flat rate on a time-basis (for example, the user purchases use of an e-mail application for $12.00 per month). This can be analogized to the user renting the computing resources the user needs, for the duration the user needs the computing resources. Further, the cloud provider can spread demand from multiple users across one or more machines, which improves machine utilization in an economically efficient manner. Improved machine utilization reduces a number of idle machines, which saves power. Thus, computing resources are efficiently shared among many users, which results in the economy of scale, cost savings for users, profits for cloud providers, and power savings.

Cloud computing is also dynamically scalable (though not in an unlimited manner) to meet a user's timely needs (for example, pay-as-you-grow (or shrink)). A workload can be run on multiple machines (for example, physical, virtual, or both) to meet service demand. A workload can be a combination of one or more processing loads, one or more storage loads, the like, or a combination thereof. The user can thus save money which would otherwise be allocated to purchase a multitude of computing resources needed to ensure the user can meet the user's peak needs.

Cloud computing also advantageously enables the user to focus on the user's core tasks, and unburdens the user from having to purchase, configure, secure, and maintain computing resources. The user is further unburdened by not having to learn new computing skills needed to configure and maintain underlying computing resources. Many of the cloud's processes are transparent to the user. Software running on the cloud may appear, to a user, on the user's computer as if the software was installed and running locally on the user's computer. Cloud computing can present the user with a simple environment.

A cloud can be configured based on the following service models: infrastructure as a service (IaaS), platform as a service (PaaS), software as a service (SaaS), or a combination thereof. Each of these are described in turn. Note that other service models are possible; the discussion below is not meant to be limiting.

When offering IaaS, a cloud provider offers access to at least a portion of user-configurable individual components in a shared pool of computing resources. The computing resources can include one or more processors, one or more servers (physical, virtual, or both), one or more storage devices (for example, memory, disk storage, the like, and combinations thereof), one or more network devices, one or more networks (for example, including internet protocol addresses), one or more firewalls, one or more load balancers, the like, or a combination thereof.

A user of IaaS can optionally install one or more operating systems, applications, or both, of the user's choice on the user-configurable individual components. The user may be required to maintain the installed software. The user may also be required to configure each user-configurable individual component.

In IaaS, the components can be offered for use for a user-determined duration. The components can be offered on a fractional (that is, shared) access basis or an exclusive access basis. In an example, the user can be billed for specific component use or the user can be billed at a flat rate based on the components used. IaaS offers a highly technical user a high level of implementation flexibility and a high level of configuration options.

When offering PaaS, the cloud provider offers a preconfigured arrangement of components and software, where the components and software are in a shared pool of computing resources. The computing resources can include one or more processors, one or more servers (physical, virtual, or both), one or more storage devices (for example, memory, disk storage, the like, and combinations thereof), one or more network devices, one or more networks (for example, including internet protocol addresses), one or more firewalls, one or more load balancers, the like, or a combination thereof. The preconfigured software can include one or more operating systems, one or more databases, one or more programming environments, one or more runtime environments, one or more web servers, the like, or a combination thereof.

In PaaS, the components and software can be offered for use for a user-determined duration. The components and software can be offered on a fractional (that is, shared) access basis or an exclusive access basis. In an example, the user can be billed for specific component and software use or the user can be billed at a flat rate based on the components used. PaaS advantageously offers a user, who has a specific need, a quick solution to the user's needs. However, PaaS does not require the user to purchase and manually configure the underlying resources. For example, a software developer can use a PaaS-based programming environment to develop a new program, without the software developer having to purchase a development server, an operating system for the development server, and programming language software. An environment can include a group of jointly acting computing resources.

When offering SaaS, the cloud provider offers pre-installed and cloud provider-maintained application software. The user does not maintain the underlying hardware, network, database, operating system, or application. In examples, the user can access the application software from many different locations, such as via the Internet.

In an example, the user can be billed for specific software use or the user can be billed at a flat rate based on the software used. SaaS advantageously offers a user, who has a specific software need, with a quick solution to the user's needs. However, SaaS does not require the user to purchase and manually configure the underlying resources or the software. For example, a businessperson can use a SaaS web-based email program, without the businessperson having to purchase, configure, and maintain a server, an operating system for the server, and email software.

Cloud computing has several different deployment models. For example, a private cloud deployment model can be provided for exclusive use by users in an organization. As a further, example, a community cloud deployment model can be provided for use by an exclusive community of users having a common need. Moreover, a public cloud deployment model can be provided for use by anyone. Further, any of these three deployment models can be combined and implemented with technology enabling portable data, one or more portable applications, or both.

Cloud computing requires hardware, such as one or more processors, one or more servers (physical, virtual, or both), one or more storage devices (for example, memory, disk storage, the like, and combinations thereof), one or more network devices, one or more networks, the like, or a combination thereof. Configuration of the hardware can be very flexible. A first hardware component in a first cloud can be configured to be coupled to a second hardware component located in the first cloud or located in a second cloud. The first hardware component in the first cloud can be configured to be coupled to a third hardware component located remotely from the first cloud.

FIG. 1 depicts an example cloud computing arrangement 100 including a first cloud 101 and a second cloud 102. For example, a first cloud provider can offer the first cloud 101, while a second cloud provider offers the second cloud 102.

A user device 103 is coupled to the first cloud 101 and the second cloud 102 via one or more networks 104. The user device 103 can be a computer (for example, a desktop computer, a laptop computer, a tablet computer, the like, or a combination thereof), a mobile phone, the like, or a combination thereof. The one or more networks 104 can be a private network, a local network, a wide-area network, the Internet, any suitable communication network, the like, or a combination thereof. The one or more networks 104 can be implemented on any suitable platform including a wired network, a wireless network, an optical network, the like, or a combination thereof.

The first cloud 101 can be divided into infrastructure 110, platform 120, and one or more applications 130. The infrastructure 110 includes tangible electronic hardware. The infrastructure 110 can include one or more network interface devices 111. The one or more network interface devices 111 can be coupled to the one or more networks 104. The infrastructure 110 can include one or more storage devices 112. The one or more storage devices 112 can include one or more disk storage devices, a quantity of memory (such as random-access memory (RAM), read-only memory (ROM), flash RAM, the like, or a combination thereof), one or more solid state drives (SSD), the like, or a combination thereof. The infrastructure 110 can include one or more load balancers 113, one or more servers 114, one or more Configuration Management Databases (CMDB) 115, the like, or a combination thereof. The CMDB 115 can control and manage distributed virtual computing in the first cloud 101. The CMDB 115 stores data describing policies to be enforced across constituent data centers in the first cloud 101. The CMDB 115 can also store configuration information for instantiating workloads using one or more specific environments which are configured to use the first cloud's 101 constituent computing components (for example, computing components in the infrastructure 110). Constituent components of the infrastructure 110 can be coupled to each other via a first cloud network 116.

The platform 120 and the applications 130 include software which is configured to implement, at least in part, at least a portion of the hardware in the infrastructure 110. In an example, at least one of the platform 120 or the applications 130 can be a set of computer instructions stored on a non-transitory computer-readable storage medium which, upon execution, configure one or more processors (for example, in the server 114) to create specific logic circuits (for example, one or more tangible electronic circuits configured to perform a logical operation), thus at least temporarily converting the one or more processors into a special-purpose processor.

The platform 120 can optionally include object storage 121, one or more web servers 122, identity control 123, one or more runtime queues 124, one or more databases 125, one or more development tools 126, the like, or a combination thereof.

The applications 130 can optionally include software configured to enable communications 131, management 132, collaboration 133, content 134, one or more games 135, customer relationship management 136, one or more virtual desktops 137, the like, or a combination thereof.

The second cloud 102 can be divided into infrastructure 160, platform 170, and one or more applications 180. The infrastructure 160 includes tangible electronic hardware. The infrastructure 160 can include one or more network interface devices 161. The one or more network interface devices 161 can be coupled to the one or more networks 104. The infrastructure 160 can include one or more storage devices 162. The one or more storage devices 162 can include one or more disk storage devices, a quantity of memory (such as RAM, ROM, flash RAM, the like, or a combination thereof), one or more SSD, the like, or a combination thereof. The infrastructure 160 can include one or more load balancers 163, one or more servers 164, one or more CMDB 165, the like, or a combination thereof. The CMDB 165 can control and manage distributed virtual computing in the second cloud 102. The CMDB 165 stores data describing policies to be enforced across constituent data centers in the second cloud 102. The CMDB 165 can also store configuration information for instantiating workloads using one or more specific environments which are configured to use the second cloud's 102 constituent computing components (for example, computing components in the infrastructure 160). Constituent components of the infrastructure 160 can be coupled to each other via a first cloud network 166.

The platform 170 and the applications 180 include software which is configured to implement, at least in part, at least a portion of the hardware in the infrastructure 160. In an example, at least one of the platform 170 or the applications 180 can be a set of computer instructions stored on a non-transitory computer-readable storage medium which, upon execution, configure one or more processors (for example, in the server 164) to create specific logic circuits (for example, one or more tangible electronic circuits configured to perform a logical operation), thus at least temporarily converting the one or more processors into a special-purpose processor.

The platform 170 can optionally include object storage 171, one or more web servers 172, identity control 173, one or more runtime queues 174, one or more databases 175, one or more development tools 176, the like, or a combination thereof.

The applications 180 can optionally include software configured to enable communications 181, management 182, collaboration 183, content 184, one or more games 185, customer relationship management 186, one or more virtual desktops 187, the like, or a combination thereof.

In an example, a user can implement computing resources in a cloud (for example, the first cloud 101, the second cloud 102) by creating and instantiating one or more workloads (for example, one or more virtual machines including an operating system and user-required specific software configured to run on a specific type of server). Cloud-enabled virtualization enables the user to interact with an abstraction which takes the place of a physical system. The user can access, configure, and manage the computing resources via a cloud's respective portal, an application programming interface (API), the like, or a combination thereof.

Different cloud providers offer different clouds. For example, a first cloud provider can offer the first cloud 101, while a second cloud provider offers the second cloud 102. This is beneficial, as the cost for a single cloud provider to provide all conceivable computing resources is prohibitive. This also provides cloud users with more options than can be provided by a single cloud provider. Accordingly, to meet a certain need, a user may want to implement a collection of computing resources which includes computing resources in disparate clouds. For example, the user may need to implement a collection of computing resources including a first computing resource which is available in the first cloud 101 and not available in the second cloud 102. The user's collection of computing resources may also include a second computing resource which is available in the second cloud 102 and not available in the first cloud 101. The first and second computing resources likely will have different, and possibly incompatible, respective APIs. The provided apparatus and methods enable the user to manage implementing different computing resources which are different parts of different clouds.

Figure 2:
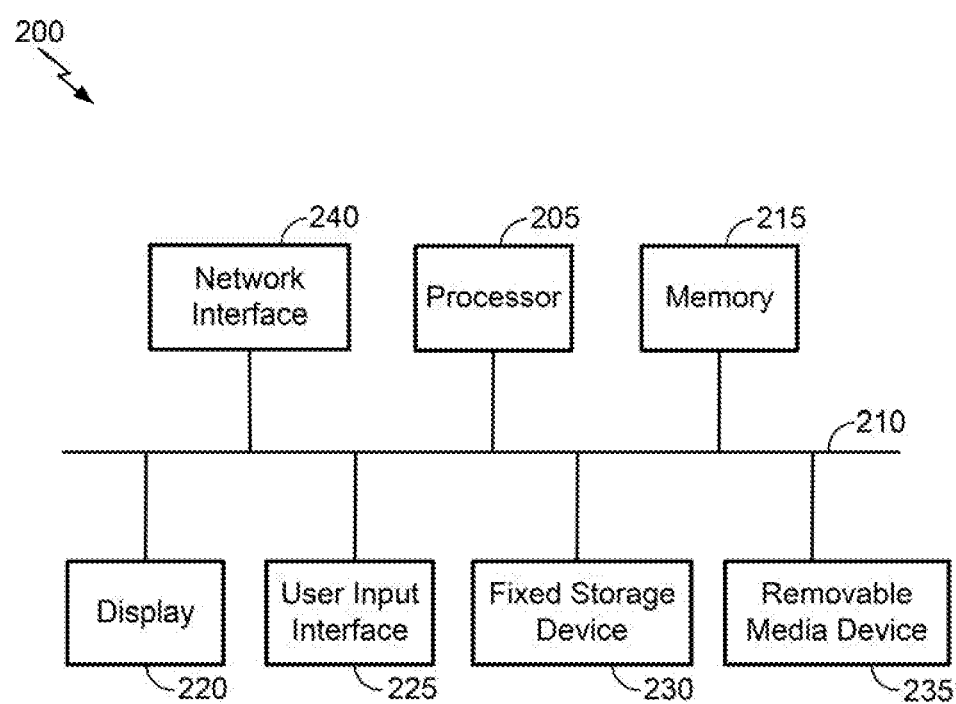
FIG. 2 depicts an example computing device suitable for implementing examples of the presently disclosed subject matter.

FIG. 2 illustrates an example computing device 200 suitable for implementing examples of the presently disclosed subject matter. In an example, the computing device 200 can be the user device 103. At least a portion of the methods, sequences, algorithms, steps, or blocks described in connection with the examples disclosed hereby can be embodied directly in hardware, in software executed by a processor (for example, a processor described hereby), or in a combination of the two. In an example, a processor includes multiple discrete hardware components. A software module can reside in a storage medium (for example, a memory device), such as a RAM, a flash memory, a ROM, an erasable programmable read-only memory (EPROM), an electrically erasable programmable read-only memory (EEPROM), a register, a hard disk, a removable disk, a compact disc read-only memory (CD-ROM), a storage medium, the like, or a combination thereof. An example storage medium (for example, a memory device) can be coupled to the processor so the processor can read information from the storage medium, write information to the storage medium, or both. In an example, the storage medium can be integral with the processor.

Further, examples provided hereby are described in terms of sequences of actions to be performed by, for example, one or more elements of a computing device. The actions described hereby can be performed by a specific circuit (for example, an application specific integrated circuit (ASIC)), by program instructions being executed by one or more processors, or by a combination of both. Additionally, a sequence of actions described hereby can be entirely within any form of non-transitory computer-readable storage medium having stored thereby a corresponding set of computer instructions which, upon execution, cause an associated processor (such as a special-purpose processor) to perform at least a portion of a method, a sequence, an algorithm, a step, or a block described hereby. Performing at least a part of a function described hereby can include initiating at least a part of a function described hereby, at least a part of a method described hereby, the like, or a combination thereof. In an example, execution of the stored instructions can transform a processor and any other cooperating devices into at least a part of an apparatus described hereby. A non-transitory (that is, a non-transient) machine-readable media specifically excludes a transitory propagating signal. Additionally, a sequence of actions described hereby can be entirely within any form of non-transitory computer-readable storage medium having stored thereby a corresponding set of computer instructions which, upon execution, configure the processor to create specific logic circuits (for example, one or more tangible electronic circuits configured to perform a logical operation) in the processor. Configuring the processor to create specific logic circuits in the processor can at least temporarily transform the processor into a specific-purpose processor. Thus, examples may be in a number of different forms, all of which have been contemplated to be within the scope of the disclosure.

In an example, when a general-purpose computer (for example, a processor) is configured to perform at least a portion of a method described hereby, then the general-purpose computer becomes a special-purpose computer which is not generic and is not a general-purpose computer. In an example, loading a general-purpose computer with special programming can cause the general-purpose computer to be configured to perform at least a portion of a method, a sequence, an algorithm, a step, or a block described in connection with an example disclosed hereby. Special programming can constitute any software which can cause a computer (for example, a general-purpose computer, a special-purpose computer, etc.) to be configured to perform one or more functions, features, steps algorithms, blocks, or a combination thereof, as disclosed hereby. A sufficient algorithm can constitute special programming. In an example, a combination of two or more related method steps disclosed hereby can form a sufficient algorithm.

The computing device 200 can be, for example, a desktop computer, a laptop computer, a mobile device, the like, or a combination thereof. The computing device 200 can include a processor 205, a bus 210, a memory 215 (such as RAM, ROM, flash RAM, the like, or a combination thereof), a video display 220 (such as a display screen), a user input interface 225 (which can include one or more controllers and associated user input devices such as a keyboard, mouse, touch screen, the like, or a combination thereof), a fixed storage device 230 (such as a hard drive, flash storage, the like, or a combination thereof), a removable media device 235 (operative to control and receive an optical disk, flash drive, the like, or a combination thereof), a network interface 240 operable to communicate with one or more remote devices via a suitable network connection, or a combination thereof. Examples of the disclosed subject matter can be implemented in, and used with, different component and network architectures.

The processor 205 is configured to control operation of the user device 200, including performing at least a part of a method described hereby. The processor 205 can perform logical and arithmetic operations based on processor-executable instructions stored within the memory 215. The processor 205 can execute instructions stored in the memory 215 to implement at least a part of a method described herein (for example, the processing illustrated in FIGS. 3A to 3B). The instructions, when executed by the processor 205, can transform the processor 205 into a special-purpose processor which causes the processor to perform at least a part of a function described hereby.

The processor 205 can comprise or be a component of a processing system implemented with one or more processors. The one or more processors can be implemented with a microprocessor, a microcontroller, a digital signal processor, a field programmable gate array (FPGA), a programmable logic device (PLD), an ASIC, a controller, a state machine, gated logic, a discrete hardware component, a dedicated hardware finite state machine, any other suitable entity which can at least one of manipulate information (for example, calculating, logical operations, and the like), control another device, the like, or a combination thereof. The processor 205 may also be referred to as a CPU, a special-purpose processor, or both.

The bus 210 interconnects components of the computing device 200. The bus 210 can enable information communication between the processor 205 and one or more components coupled to the processor 205. The bus system 210 can include a data bus, a power bus, a control signal bus, a status signal bus, the like, or a combination thereof. The components of the computing device 200 can be coupled together to communicate with each other using a different suitable mechanism.

The memory 215, can include at least one of ROM, RAM, a flash memory, an EPROM, an EEPROM, a register, other memory, the like, or a combination thereof stores information (for example, data, instructions, software, the like, or a combination thereof) and is configured to provide the information to the processor 205. The RAM can be a main memory configured to store an operating system, an application program, the like, or a combination thereof. The ROM (for example, a flash memory) can be configured to store a basic input-output system (BIOS) which can control basic hardware operation such as the processor's 205 interaction with peripheral components. The memory 215 can also include a non-transitory machine-readable media configured to store software. Software can mean any type of instructions, whether referred to as at least one of software, firmware, middleware, microcode, hardware description language, the like, or a combination thereof. Instructions can include code (for example, in source code format, in binary code format, executable code format, or in any other suitable code format). The memory 215 is an example of an electronic memory device.

The video display 220 can include a component configured to visually convey information to a user of the computing device 200.

The user input interface 225 can include a keypad, a microphone, a speaker, a display, the like, or a combination thereof. The user input interface 225 can include a component configured to convey information to a user of the computing device 200, receive information from the user of the computing device 200, or both.

The fixed storage device 230 can be integral with the computing device 200 or can be separate and accessed through other interfaces. The fixed storage device 230 can be an information storage device which is not configured to be removed during use, such as a hard disk drive.

The removable media device 235 can be integral with the computing device 200 or can be separate and accessed through other interfaces. The removable media device 235 can be an information storage device which is configured to be removed during use, such as a memory card, a jump drive, flash memory, the like, or a combination thereof. Code to implement the present disclosure can be stored in computer-readable storage media such as one or more of the memory 215, the fixed storage device 230, the removable media device 235, a remote storage location, the like, or a combination thereof.

The network interface 240 can electrically couple the computing device 200 to a network and enable exchange of information between the computing device 200 and the network. The network, in turn, can couple the computing device 200 to another electronic device, such as a remote server, a remote storage medium, the like, or a combination thereof. The network can enable exchange of information between the computing device 200 and the electronic device.

The network interface 240 can provide coupling (for example, to the network 104) via a wired connection, a wireless connection, or a combination thereof. The network interface 240 can provide such connection using any suitable technique and protocol as is readily understood by one of skill in the art. Example techniques and protocols include digital cellular telephone, WiFi™, Bluetooth®, near-field communications (NFC), the like, and combinations thereof. For example, the network interface 240 can enable the computing device 200 to communicate with other computers (for example, the first cloud 101 and the second cloud 102) via one or more local, wide-area, or other communication networks. Other devices or components (not shown in FIG. 2) can be coupled via the network interface 240.

All of the components illustrated in FIG. 2 need not be present to practice the present disclosure. Further, the components can be interconnected in different ways from that illustrated.

Figure 3A:
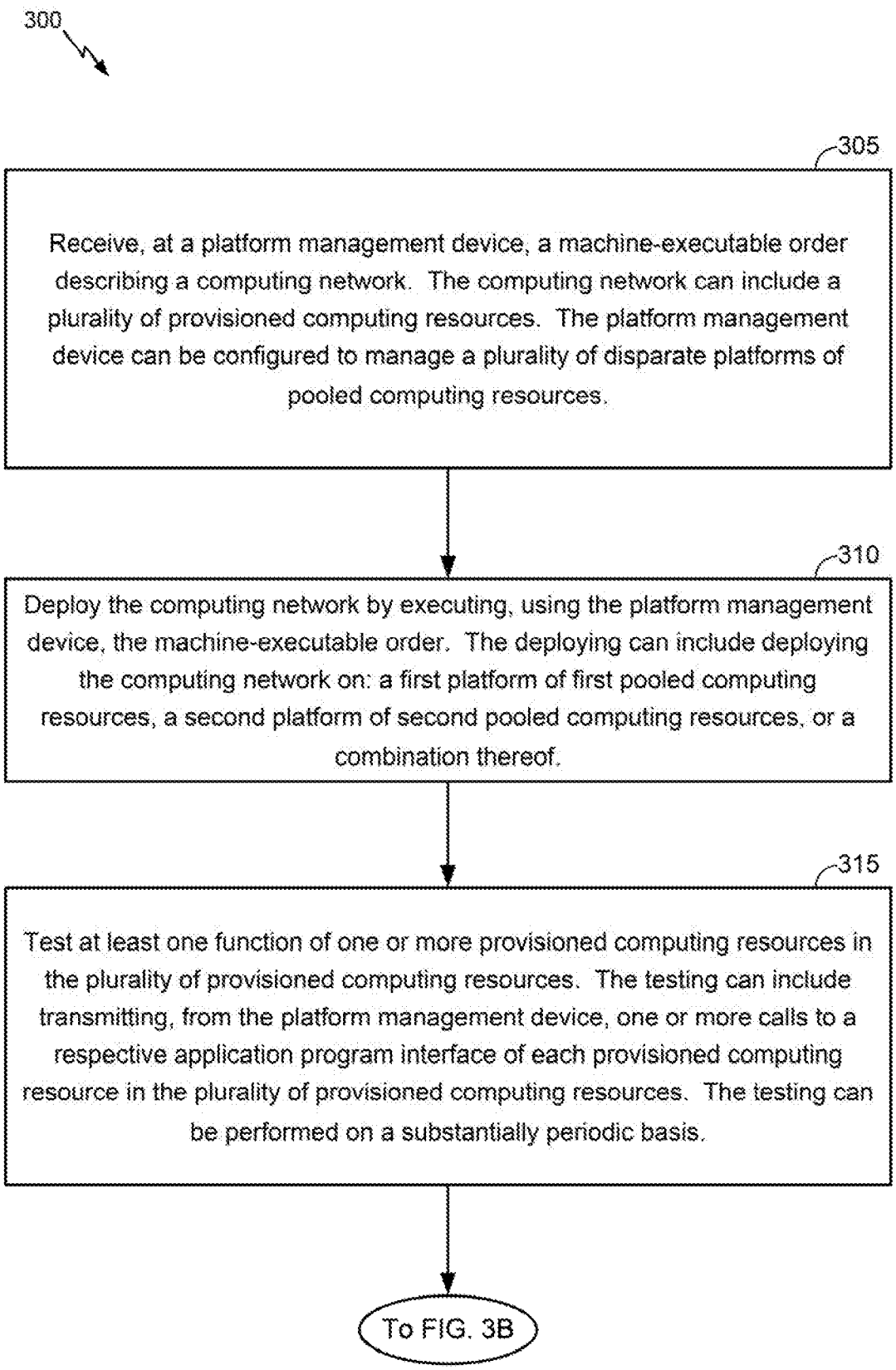
FIGS. 3A and 3B depict an example method for infrastructure testing.
Figure 3B:
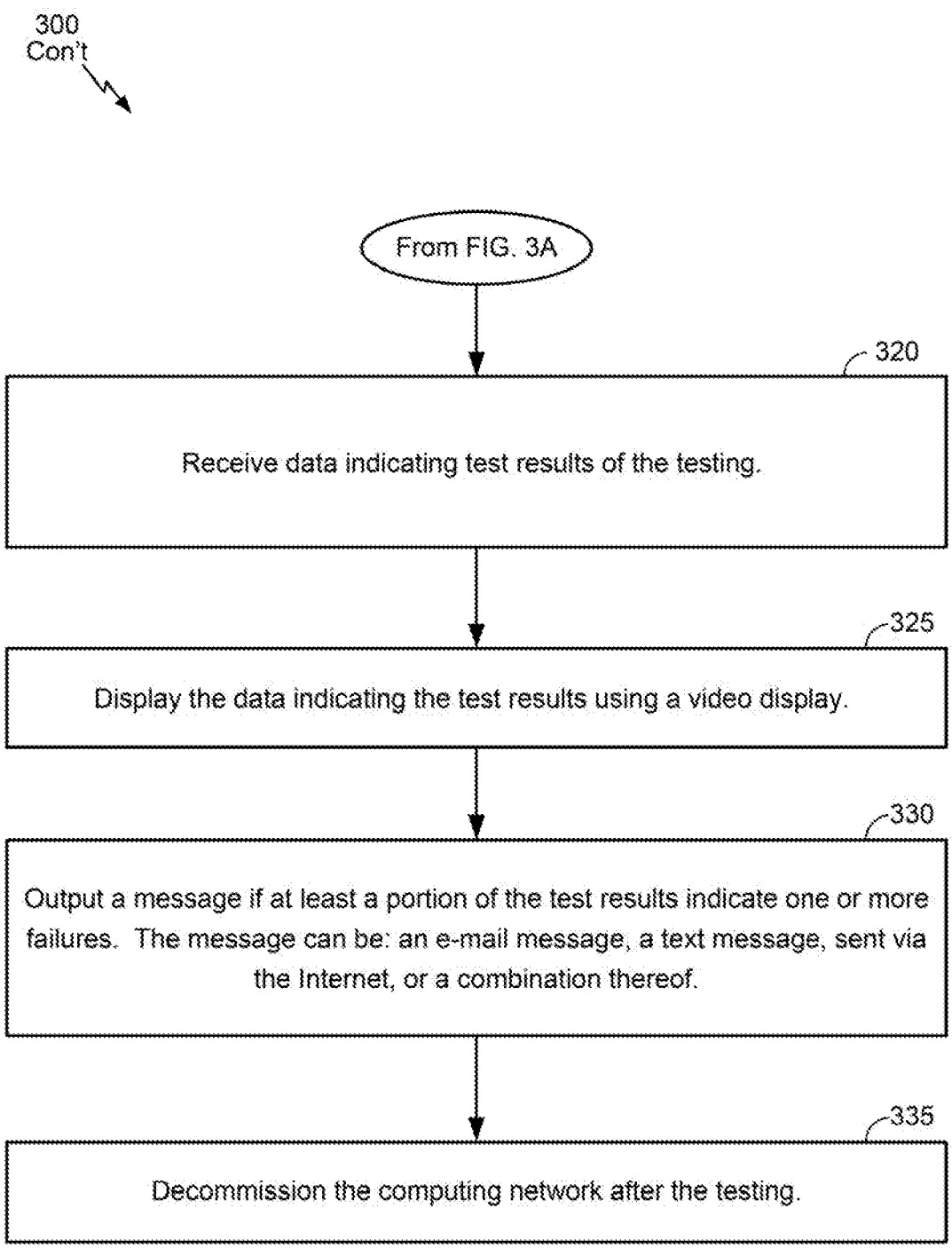

FIGS. 3A and 3B depict an example method 300 for testing infrastructure. The method 300 can be performed at least in part by at least a portion of the apparatus described hereby, such as the user device 103, the computing device 200, the like, or a combination thereof. The method 300 can advantageously test cloud ecosystem availability by performing end-to-end testing of at least one deployed computing resource to determine if the infrastructure target is performing as required. The method 300 can advantageously determine if a specific network configuration, such as a network configuration across multiple, disparate clouds, can perform as expected. The method 300 can provide these beneficial advantages in a timely manner and without inadvertently using a customer as a tester. The method 300 can advantageously eliminate a requirement that a user must manually program tests for each different respective disparate management platform for each target cloud on which computing resources are deployed. A platform management device which is configured to perform at least a portion of the method 300 has improved functions, relative to conventional techniques and devices.

The method 300 can be performed on a periodic basis (for example, hourly, daily, at a specific time each day, etc.) or on a substantially periodic basis. In examples, initiating the method 300 may or may not be triggered automatically. In an example, the initiating the method 300 is not performed automatically, but instead can be performed in response to receiving an instruction to initiate the method 300. The instruction can be received via a GUI. The GUI can be accessible via the Internet, which enables conveniently both initiating and performing the method 300 remotely via the Internet.

In block 305, a machine-executable order describing a computing network is received at a platform management device. In an example, the machine-executable order has previously been run. In a further example, the previously run machine-executable order has failed completely or has had at least partial success. The machine-executable order can be blueprint describing: a deployment of multiple computing resources, programmed functions of the multiple computing resources, coupling of one or more of the multiple computing resources to each other, coupling of one or more of the multiple computing resources to one or more devices outside of the multiple computing resources, the like, or a combination thereof.

The machine-executable order can include an executable script (for example, a remote script), user-provided code, a webhook, an e-mail program, a workflow coordinator, a cross-cloud orchestration engine instruction, a service blueprint, the like, or a practicable combination thereof. The machine-executable order, when executed, can: initiate provisioning one or more servers, initiate provisioning one or more CPUs, initiate provisioning a quantity of memory, initiate provisioning one or more virtualization host systems, initiate provisioning one or more domain name servers, initiate provisioning one or more asset tracking systems, initiate provisioning one or more monitoring systems, initiate provisioning one or more backup systems, initiate provisioning one or more hostname reservation systems, initiate provisioning one or more change management systems, initiate provisioning one or more objects, initiate provisioning a virtual network, initiate configuring an operating system, initiate configuring software, initiate configuring a cluster, initiate configuring a network, initiate deploying a pod of containers, initiate a networking change, initiate deploying a virtual network, initiate deploying a load balancer, initiate emailing a user, initiate coupling a virtual network to an external system, initiate performing an automatable operation, initiate scaling up a deployed computing resource, initiate scaling down a deployed computing resource, initiate provisioning one or more web servers, the like, or a practicable combination thereof.

Optionally, the machine-executable order can include: one or more configuration details of a server, one or more compliance parameters for the server, one or more configuration details for a workload, one or more compliance parameters for the workload, one or more configuration details of a virtual network, one or more configuration details of an operating system, one or more configuration details of software, one or more configuration details of hardware, one or more configuration details of an object, one or more configuration details of a cluster, one or more configuration details of a network, one or more configuration details of a web server, a server deployment, a remote script configured to be run on a server, instructions to deploy a pod of containers, instructions to deploy a networking change, instructions to deploy a virtual network, instructions to deploy a load balancer, instructions to email a user, instructions to couple a virtual network to an external system, instructions to perform an automatable operation, instructions to establish an internet protocol address, the like, or a combination thereof.

The computing network can include a plurality of provisioned computing resources. At least a portion of the plurality of computing resources is available from a first platform, a second platform, or a combination thereof. In an example, a first portion of the plurality of computing resources is available from the first platform, but is not available from the second platform. In a further example, a second portion of the plurality of computing resources is available from the second platform, but is not available from the first platform. In an example, a platform is a cloud computing system. Thus, the computing network is across multiple disparate clouds, and a cloud platform management device performing the method 300 is configured to implement the computing network across the multiple disparate clouds. The plurality of provisioned computing resources can include: one or more objects, one or more clusters, one or more load balancers, one or more servers, one or more CPUs, a quantity of memory, one or more virtualization host systems, one or more domain name servers, one or more asset tracking systems, one or more monitoring systems, one or more backup systems, one or more hostname reservation systems, one or more change management systems, one or more Internet servers, one or more databases, one or more operating systems, one or more applications, one or more websites, one or more pods of containers, one or more storage devices, a quantity of memory, one or more network devices, one or more security devices, one or more networks, one or more virtual networks, one or more virtualization host systems, one or more domain name storage systems, one or more asset tracking systems, one or more network monitoring systems, one or more hostname reservation systems, one or more change management systems, the like, or a combination thereof.

The platform management device can be configured to manage a plurality of disparate platforms of pooled computing resources.

At least a portion of the machine-executable order can be saved to an electronic memory device (for example, in the platform management device), at least a portion of the one or more instructions can be retrieved from the electronic memory device, or both.

In block 310, the computing network is deployed by executing, using the platform management device, the machine-executable order. The deploying can include deploying the computing network on: a first platform of first pooled computing resources, a second platform of second pooled computing resources, or a combination thereof.

The deploying can be performed according to a machine-executable order describing a computing network after receiving the machine-executable order describing the computing network. In an example, the deploying is not performed automatically, but instead can be performed in response to receiving an instruction (for example, via a GUI) to initiate the deploying.

The deploying of the computing network can include calling one or more APIs to configure the plurality of computing resources and thus form the network. The content of the calls can be based on at least a portion of the machine-executable order received in block 305. The calls can also include configuration information which can be used to configure one or more of the computing resources in the plurality of computing resources. In an example, in order to enable deploying a first computing resource and a second computing resource, a first call is sent to a first respective API of the first computing resource in a first cloud and a second call is sent to the second respective API of a second computing resource in a second cloud. The one or more APIs can be called by at least a portion of the apparatus described hereby, such as the user device 103, the computing device 200, the like, or a combination thereof. The calling can include calling APIs and using tools which are respectively native to each of a plurality of disparate clouds. Thus, the testing can test target clouds, as well as an application stack.

In block 315, at least one function of one or more provisioned computing resources in the plurality of provisioned computing resources is tested. In an example, at least one function of every provisioned computing resource in the plurality of provisioned computing resources is tested. The testing can include testing of computing resources on an individual basis, in unison with each other, in unison with one or more devices outside of the network, the like, or a combination thereof. The testing can include end-to-end testing of every provisioned computing resource in the plurality of provisioned computing resources is tested. The testing can identify problems with the deployed network, such as one or more communication errors between devices, one or more incompatible hardware interfaces, one or more incompatible software interfaces, one or more malfunctioning computing resources, one or more internet protocol address errors, the like, or a combination thereof. The end-to-end testing reduces, and can eliminate, a possibility of inadvertently using a customer as a tester.

The testing can be performed on a substantially periodic basis (for example, hourly, daily, etc.) or a periodic basis. In an example, the testing can be triggered automatically after deploying at least a portion of the computing network. In an example, the testing is not performed automatically, but instead can be performed in response to receiving an instruction (for example, via a GUI) to initiate the testing. In an example, the testing is enabled by having been previously added to the machine-executable order. The testing can target specific computing resources which have previously caused end user problems. The testing can target specific computing resources which have previously failed to properly perform.

The testing can be initiated via the network interface 240 or the like. The testing can include transmitting, from the platform management device, one or more calls to a respective API of one or more provisioned computing resource in the plurality of provisioned computing resources. In an example, the testing can include transmitting, from the platform management device, one or more calls to a respective API of every provisioned computing resource in the plurality of provisioned computing resources. The API calls can direct respective computing resources to perform a specific function to be tested. Thus, the testing can be performed across multiple clouds to ensure correct function of a cross-could network deployment.

One or more example inputs to the network can also be provided to test the network. The one or more example inputs can be associated with one or more known (that is, expected) results of the test which are "correct" results if the network is performing correctly. Further, the one or more example inputs can be associated with one or more known (that is, expected) results of the test which are "incorrect" results if the network is not performing correctly. One or more of the incorrect results can be respectively associated with a related point of failure in the network.

In optional block 320, data indicating test results of the testing is received, such as from one or more computing resources in the plurality of computing resources. The test results can be received via the network interface 240 or the like. The test results can be received in response to one or more API calls sent in block 315.

At least a portion of the data indicating the test results of the testing can be saved to the electronic memory device.

A description of the data indicating the test results of the testing can be displayed (for example, with a video display, such as a video display of the computing device). The description of the data indicating the test results of the testing can form at least a portion of a GUI.

In an example, the data indicating the test results is received in response to the one or more example inputs provided to the network to test the network. The data indicating the test results can be compared to the associated one or more known "correct" results to determine if the network is performing correctly, not performing correctly, an extent to which the network is performing correctly, an extent to which the network is not performing correctly, the like, or a combination thereof. Further, the data indicating the test results can be compared to the associated one or more known "incorrect" results to determine if the network is performing correctly, not performing correctly, an extent to which the network is performing correctly, an extent to which the network is not performing correctly, the like, or a combination thereof. If the comparing yields the network is not performing correctly, then an incorrect result can be identified based on the data indicating the test results. A cross-reference between the identified incorrect result and a related computing resource can be used to identify the related point of failure in the network.

In optional block 325, the data indicating the test results is displayed (for example via the GUI) using the video display. An identified point of failure can also be displayed (for example via the GUI) using the video display. Optionally, the data indicating the test results is printed, such as with a printer.

At least a portion of the data indicating the test results of the testing can be retrieved from the electronic memory device to enable the displaying.

In optional block 330, if at least a portion of the test results indicate one or more failures of the network, a message can be output. The message can be: an e-mail message, a text message, a communication sent via the Internet, or a combination thereof. The message can be displayed (for example, with a video display, such as a video display of the computing device). The message can be displayed on the GUI. The message can include a clickable link to a relevant job which is impacted, or will be impacted, by the one or more failures. Optionally, the message is printed, such as with a printer.

In optional block 335, the computing network is decommissioned after the testing. In an example, the decommissioning can be triggered automatically after receiving the test results. In an example, the decommissioning is not performed automatically, but instead can be performed in response to receiving an instruction (for example, from a user) to initiate the decommissioning. The decommissioning can reduce expenses by reducing an amount of time the network is deployed.

Decommissioning the computing network can include calling one or more APIs to decommission the plurality of computing resources and thus decommission the network. The content of the calls can be based on the portion of the machine-executable order received in block 305. In an example, in order to decommission the first computing resource and the second computing resource, a third call is sent to the first respective API of the first computing resource in the first cloud and a fourth call is sent to the second respective API of the second computing resource in the second cloud. The one or more APIs can be called by at least a portion of the apparatus described hereby, such as the user device 103, the computing device 200, the like, or a combination thereof.

The foregoing blocks are not limiting of the examples. The blocks can be combined and/or the order can be rearranged, as practicable.

As used hereby, the term "example" means "serving as an example, instance, or illustration." Any example described as an "example" is not necessarily to be construed as preferred or advantageous over other examples. Likewise, the term "examples" does not require all examples include the discussed feature, advantage, or mode of operation. Use of the terms "in one example," "an example," "in one feature," and/or "a feature" in this specification does not necessarily refer to the same feature and/or example. Furthermore, a particular feature and/or structure can be combined with one or more other features and/or structures.

Moreover, at least a portion of the apparatus described hereby can be configured to perform at least a portion of a method described hereby.

It should be noted the terms "connected," "coupled," and any variant thereof, mean any connection or coupling between elements, either direct or indirect, and can encompass a presence of an intermediate element between two elements which are "connected" or "coupled" together via the intermediate element. Coupling and connection between the elements can be physical, logical, or a combination thereof. Elements can be "connected" or "coupled" together, for example, by using one or more wires, cables, printed electrical connections, electromagnetic energy, and the like. The electromagnetic energy can have a wavelength at a radio frequency, a microwave frequency, a visible optical frequency, an invisible optical frequency, and the like, as practicable. These are several non-limiting and non-exhaustive examples.

The term "signal" can include any signal such as a data signal, an audio signal, a video signal, a multimedia signal, an analog signal, a digital signal, and the like. Information and signals described hereby can be represented using any of a variety of different technologies and techniques. For example, data, an instruction, a process step, a process block, a command, information, a signal, a bit, a symbol, and the like which are referred to hereby can be represented by a voltage, a current, an electromagnetic wave, a magnetic field, a magnetic particle, an optical field, an optical particle, and/or any practical combination thereof, depending at least in part on the particular application, at least in part on the desired design, at least in part on the corresponding technology, and/or at least in part on like factors.

A reference using a designation such as "first," "second," and so forth does not limit either the quantity or the order of those elements. Rather, these designations are used as a convenient method of distinguishing between two or more elements or instances of an element. Thus, a reference to first and second elements does not mean only two elements can be employed, or the first element must necessarily precede the second element. Also, unless stated otherwise, a set of elements can comprise one or more elements. In addition, terminology of the form "at least one of: A, B, or C" or "one or more of A, B, or C" or "at least one of the group consisting of A, B, and C" used in the description or the claims can be interpreted as "A or B or C or any combination of these elements." For example, this terminology can include A, or B, or C, or A and B, or A and C, or A and B and C, or 2A, or 2B, or 2C, and so on.

The terminology used hereby is for the purpose of describing particular examples only and is not intended to be limiting. As used hereby, the singular forms "a," "an," and "the" include the plural forms as well, unless the context clearly indicates otherwise. In other words, the singular portends the plural, where practicable. Further, the terms "comprises," "comprising," "includes," and "including," specify a presence of a feature, an integer, a step, a block, an operation, an element, a component, and the like, but do not necessarily preclude a presence or an addition of another feature, integer, step, block, operation, element, component, and the like.

Those of skill in the art will appreciate the example logical blocks, modules, circuits, and steps described in the examples disclosed hereby can be implemented as electronic hardware, computer software, or combinations of both, as practicable. To clearly illustrate this interchangeability of hardware and software, example components, blocks, modules, circuits, and steps have been described hereby generally in terms of their functionality. Whether such functionality is implemented as hardware or software depends upon the particular application and design constraints imposed on an overall system. Skilled artisans can implement the described functionality in different ways for each particular application, but such implementation decisions should not be interpreted as causing a departure from the scope of the present disclosure. In addition, for each of the examples described hereby, a corresponding electrical circuit of any such examples may be described hereby as, for example, "logic configured to" perform a described action.

At least one example provided hereby can include a non-transitory (that is, a non-transient) machine-readable media and/or a non-transitory (that is, a non-transient) computer-readable media storing processor-executable instructions (for example, "code") configured to cause a processor (for example, a special-purpose processor) to transform the processor and any other cooperating devices into a machine (for example, a special-purpose processor) configured to perform at least a part of a function described hereby, at least a part of a method described hereby, the like, or a combination thereof. Performing the at least a part of a function described hereby can include initiating at least a part of the function described hereby. Performing the at least a part of a method described hereby can include initiating at least a part of the method described hereby. In an example, execution of the stored instructions can transform a processor and any other cooperating devices into at least a part of an apparatus described hereby. A non-transitory (that is, a non-transient) machine-readable media specifically excludes a transitory propagating signal. Further, one or more embodiments can include a computer-readable medium embodying at least a part of a function described hereby, at least a part of a method described hereby, the like, or a combination thereof.

Nothing stated or depicted in this application is intended to dedicate any component, step, block, feature, object, benefit, advantage, or equivalent to the public, regardless of whether the component, step, block, feature, object, benefit, advantage, or the equivalent is recited in the claims. While this disclosure describes examples, changes and modifications can be made to the examples disclosed hereby without departing from the scope defined by the appended claims. The present disclosure is not intended to be limited to the specifically disclosed examples alone.

What is claimed is:

1. A method, comprising:
   receiving, at a platform management device, a machine-executable order describing a computing network, wherein the computing network includes a plurality of provisioned computing resources disposed in a plurality of clouds;
   deploying the computing network across the plurality of clouds by executing, using the platform management device, the machine-executable order;
   testing at least one function of each provisioned computing resource, in the plurality of provisioned computing resources from the plurality of clouds, that has previously failed to perform as expected to determine that the computing network performs as expected, wherein the testing includes transmitting, from the platform management device, one or more calls to a respective application program interface of the each provisioned computing resource in the plurality of provisioned computing resources;
   determining, based on a result of the testing, that the computing network at least one of lacks a communication error between devices of the computing network, lacks incompatible hardware interfaces of the devices of the computing network, lacks incompatible software interfaces of the devices of the computing network, or lacks internet protocol address errors of the devices of the computing network; and
   instantiating, by the platform management device and in response to a determination that the computing network performs as expected, a workload that is run by at least some of the provisioned computing resources of the computing network.

2. The method of claim 1, wherein the platform management device is configured to manage a plurality of disparate platforms of pooled computing resources.

3. The method of claim 1, wherein the plurality of provisioned computing resources includes:
   one or more objects;
   one or more clusters;
   one or more load balancers;
   one or more servers;
   one or more CPUs;
   a quantity of memory;
   one or more virtualization host systems;
   one or more domain name servers;
   one or more asset tracking systems;
   one or more monitoring systems;
   one or more backup systems;
   one or more hostname reservation systems;
   one or more change management systems;
   one or more Internet servers;
   one or more databases;
   one or more operating systems;
   one or more applications;
   one or more web sites;
   one or more pods of containers;
   one or more storage devices;
   one or more network devices;
   one or more security devices;
   one or more networks;
   one or more virtual networks;
   one or more domain name storage systems;
   one or more network monitoring systems; or
   a combination thereof.

4. The method of claim 1, wherein the deploying includes deploying the computing network on:
   a first platform of first pooled computing resources;
   a second platform of second pooled computing resources; or
   a combination thereof.

5. The method of claim 1, wherein the testing is performed on a periodic basis.

6. The method of claim 1, further comprising receiving data indicating test results of the testing.

7. The method of claim 6, further comprising:
   displaying, using a video display, the data indicating the test results; and
   outputting, if at least a portion of the test results indicates one or more failures, a message, wherein the message is:
   an e-mail message,
   a text message,
   a communication sent via the Internet, or
   a combination thereof.

8. The method of claim 1, further comprising decommissioning the computing network after the testing.

9. An apparatus, comprising:
means for receiving a machine-executable order describing a computing network, wherein the computing network includes a plurality of provisioned computing resources disposed in a plurality of clouds;
means for deploying the computing network across the plurality of clouds by executing the machine-executable order;
means for testing at least one function of each provisioned computing resource, in the plurality of provisioned computing resources from the plurality of clouds, that has previously failed to perform as expected to determine that the computing network performs as expected, wherein the testing includes transmitting, from the platform management device, one or more calls to a respective application program interface of the each provisioned computing resource in the plurality of provisioned computing resources;
means for determining, based on a result of the testing, that the computing network at least one of lacks a communication error between devices of the computing network, lacks incompatible hardware interfaces of the devices of the computing network, lacks incompatible software interfaces of the devices of the computing network, or lacks internet protocol address errors of the devices of the computing network; and
means for instantiating, in response to a determination that the computing network performs as expected, a workload that is run by at least some of the provisioned computing resources of the computing network.

10. The apparatus of claim 9, wherein the means for receiving is configured to manage a plurality of disparate platforms of pooled computing resources.

11. The apparatus of claim 9, wherein the plurality of provisioned computing resources includes:
one or more objects;
one or more clusters;
one or more load balancers;
one or more servers;
one or more CPUs;
a quantity of memory;
one or more virtualization host systems;
one or more domain name servers;
one or more asset tracking systems;
one or more monitoring systems;
one or more backup systems;
one or more hostname reservation systems;
one or more change management systems;
one or more Internet servers;
one or more databases;
one or more operating systems;
one or more applications;
one or more web sites;
one or more pods of containers; one or more storage devices;
one or more network devices;
one or more security devices;
one or more networks;
one or more virtual networks;
one or more domain name storage systems;
one or more network monitoring systems; or
a combination thereof.

12. The apparatus of claim 9, wherein the means for deploying includes means for deploying the computing network on:
a first platform of first pooled computing resources;
a second platform of second pooled computing resources; or
a combination thereof.

13. The apparatus of claim 9, wherein the means for testing is configured to perform the testing on a periodic basis.

14. The apparatus of claim 9, further comprising means for receiving data indicating test results of the testing.

15. The apparatus of claim 14, further comprising:
means for displaying the data indicating the test results; and
means for outputting, if at least a portion of the test results indicates one or more failures, a message, wherein the message is:
an e-mail message,
a text message,
a communication sent via the Internet, or
a combination thereof.

16. The apparatus of claim 9, further comprising means for decommissioning the computing network after the testing.

17. An apparatus, comprising:
a processor; and
a memory coupled to the processor and configured to cause the processor to initiate creating specific logic circuits within the processor, wherein the specific logic circuits are configured to cause the processor to initiate:
receiving a machine-executable order describing a computing network, wherein the computing network includes a plurality of provisioned computing resources disposed in a plurality of clouds;
deploying the computing network across the plurality of clouds by executing the machine-executable order;
testing at least one function of each provisioned computing resource, in the plurality of provisioned computing resources from the plurality of clouds, that has previously failed to perform as expected to determine that the computing network performs as expected, wherein the testing includes transmitting, from the platform management device, one or more calls to a respective application program interface of the each provisioned computing resource in the plurality of provisioned computing resources;
determining, based on a result of the testing, that the computing network at least one of lacks a communication error between devices of the computing network, lacks incompatible hardware interfaces of the devices of the computing network, lacks incompatible software interfaces of the devices of the computing network, or lacks internet protocol address errors of the devices of the computing network; and
instantiating, in response to a determination that the computing network performs as expected, a workload that is run by at least some of the provisioned computing resources of the computing network.

18. The apparatus of claim 17, wherein the apparatus is configured to manage a plurality of disparate platforms of pooled computing resources.

19. The apparatus of claim 17, wherein the plurality of provisioned computing resources includes:
one or more objects;
one or more clusters;
one or more load balancers;
one or more servers;
one or more CPUs;

a quantity of memory;
one or more virtualization host systems;
one or more domain name servers;
one or more asset tracking systems;
one or more monitoring systems;
one or more backup systems;
one or more hostname reservation systems;
one or more change management systems;
one or more Internet servers;
one or more databases;
one or more operating systems;
one or more applications;
one or more web sites;
one or more pods of containers;
one or more storage devices;
one or more network devices;
one or more security devices;
one or more networks;
one or more virtual networks;
one or more domain name storage systems;
one or more network monitoring systems; or
a combination thereof.

20. The apparatus of claim 17, wherein the deploying includes deploying the computing network on:
a first platform of first pooled computing resources;
a second platform of second pooled computing resources; or
a combination thereof.

21. The apparatus of claim 17, wherein the testing is performed on a periodic basis.

22. The apparatus of claim 17, wherein the memory is configured to cause the processor to initiate creating specific logic circuits configured to cause the processor to receive data indicating test results of the testing.

23. The apparatus of claim 22, wherein the memory is configured to cause the processor to initiate creating specific logic circuits configured to cause the processor to:
display, using a video display, the data indicating the test results; and
output, if at least a portion of the test results indicates one or more failures, a message, wherein the message is:
an e-mail message,
a text message,
a communication sent via the Internet, or
a combination thereof.

24. The apparatus of claim 17, wherein the memory is configured to cause the processor to initiate creating specific logic circuits configured to cause the processor to decommission the computing network after the testing.

25. A non-transitory computer-readable medium, comprising:
processor-executable instructions stored thereon configured to cause a processor to initiate:
receiving a machine-executable order describing a computing network, wherein the computing network includes a plurality of provisioned computing resources disposed in a plurality of clouds;
deploying the computing network across the plurality of clouds by executing the machine-executable order;
testing at least one function of each provisioned computing resource, in the plurality of provisioned computing resources from the plurality of clouds, that has previously failed to perform as expected to determine that the computing network performs as expected, wherein the testing includes transmitting, from the platform management device, one or more calls to a respective application program interface of the each provisioned computing resource in the plurality of provisioned computing resources;
determining, based on a result of the testing, that the computing network at least one of lacks a communication error between devices of the computing network, lacks incompatible hardware interfaces of the devices of the computing network, lacks incompatible software interfaces of the devices of the computing network, or lacks internet protocol address errors of the devices of the computing network; and
instantiating, in response to a determination that the computing network performs as expected, a workload that is run by at least some of the provisioned computing resources of the computing network.

26. The non-transitory computer-readable medium of claim 25, wherein the processor is configured to manage a plurality of disparate platforms of pooled computing resources.

27. The non-transitory computer-readable medium of claim 25, wherein the plurality of provisioned computing resources includes:
one or more objects;
one or more clusters;
one or more load balancers;
one or more servers;
one or more CPUs;
a quantity of memory;
one or more virtualization host systems;
one or more domain name servers;
one or more asset tracking systems;
one or more monitoring systems;
one or more backup systems;
one or more hostname reservation systems;
one or more change management systems;
one or more Internet servers;
one or more databases;
one or more operating systems;
one or more applications;
one or more web sites;
one or more pods of containers;
one or more storage devices;
one or more network devices;
one or more security devices;
one or more networks;
one or more virtual networks;
one or more domain name storage systems;
one or more network monitoring systems; or
a combination thereof.

28. The non-transitory computer-readable medium of claim 25, wherein the deploying includes deploying the computing network on:
a first platform of first pooled computing resources;
a second platform of second pooled computing resources; or
a combination thereof.

29. The non-transitory computer-readable medium of claim 25, wherein the testing is performed on a periodic basis.

30. The non-transitory computer-readable medium of claim 25, wherein the processor-executable instructions further include instructions configured to cause the processor to initiate receiving data indicating test results of the testing.

31. The non-transitory computer-readable medium of claim 30, wherein the processor-executable instructions further include instructions configured to cause the processor to initiate:
- displaying, using a video display, the data indicating the test results; and
- outputting, if at least a portion of the test results indicates one or more failures, a message, wherein the message is:
  - an e-mail message,
  - a text message,
  - a communication sent via the Internet, or
  - a combination thereof.

32. The non-transitory computer-readable medium of claim 25, wherein the processor-executable instructions further include instructions configured to cause the processor to initiate decommissioning the computing network after the testing.

\* \* \* \* \*